(12) United States Patent
Zheng et al.

(10) Patent No.: US 8,907,972 B2
(45) Date of Patent: Dec. 9, 2014

(54) IMAGE PROCESSING DEVICE AND METHOD

(75) Inventors: Danian Zheng, Beijing (CN); Jun Sun, Beijing (CN); Satoshi Naoi, Beijing (CN)

(73) Assignee: Fujitsu Limited, Kawaski (JP)

( * ) Notice: Subject to any disclaimer, the term of this patent is extended or adjusted under 35 U.S.C. 154(b) by 136 days.

(21) Appl. No.: 13/549,764

(22) Filed: Jul. 16, 2012

(65) Prior Publication Data
US 2013/0027419 A1    Jan. 31, 2013

(30) Foreign Application Priority Data
Jul. 19, 2011   (CN) .......................... 2011 1 0209866

(51) Int. Cl.
*G09G 5/02* (2006.01)
*G06K 9/34* (2006.01)
*H04N 1/40* (2006.01)

(52) U.S. Cl.
CPC ............ *H04N 1/40062* (2013.01); *G06K 9/342* (2013.01)
USPC ........................................................ 345/589

(58) Field of Classification Search
CPC .......... G06K 9/00409; G06K 9/00416; G06K 9/00442; G06K 9/34; G06K 9/342; G06K 9/344; G06K 9/00852; G06K 9/6204; G06K 9/38; G06K 9/00268; G06K 9/0061; G06K 15/1872; G06K 2009/4666; G06K 9/4604; G06K 9/4647; G06K 9/00; G06K 9/00456; H04N 1/40062; H04N 1/409; H04N 1/6022; H04N 1/6072; H04N 1/642; G06T 7/0081; G06T 2207/20021; G06T 2207/20144; G06T 7/0085; G06T 9/20; G06T 7/0083; G06T 11/60; G06T 2207/20152; G06T 5/50; G06T 7/2033

USPC .................................. 382/173–180; 345/589
See application file for complete search history.

(56) References Cited

U.S. PATENT DOCUMENTS

| | | | |
|---|---|---|---|
| 7,471,830 B2 * | 12/2008 | Lim et al. ...................... | 382/181 |
| 2010/0289897 A1 * | 11/2010 | Arai .............................. | 348/148 |

FOREIGN PATENT DOCUMENTS

| | | |
|---|---|---|
| CN | 101673400 | 3/2010 |
| CN | 101888469 | 11/2010 |
| JP | 4596174 | 10/2010 |

(Continued)

OTHER PUBLICATIONS

Korean Office Action mailed Aug. 30, 2013 in corresponding Korean Application No. 10-2012-0077184.

(Continued)

*Primary Examiner* — Kee M Tung
*Assistant Examiner* — Haixia Du
(74) *Attorney, Agent, or Firm* — Staas & Halsey LLP

(57) ABSTRACT

An image processing device including: a local mean image generating section; a binarization image generating section configured to generate a binarization image, wherein pixels corresponding to high frequency regions and low frequency regions have a first and second grey scales, respectively; a ternarization image generating section configured to divide, based on comparison between the image and the local mean image, first grey scale regions in the binarization image into regions having the first grey scale and regions having a third grey scale; a filling section configured to recognize connected regions having the second grey scale in the ternarization image, to fill the connected regions with the first grey scale or with the third grey scale according to grey scale of pixels at boundaries of the connected regions; and a recognizing section configured to recognize strokes according to consistency of grey scale at object boundaries in the filled ternarization image.

10 Claims, 12 Drawing Sheets

(56) References Cited

FOREIGN PATENT DOCUMENTS

| JP | 4902569 | 1/2012 |
| JP | 4986976 | 5/2012 |

OTHER PUBLICATIONS

Korean Notice of Allowance issued May 19, 2014 in corresponding Korean Patent Application No. 10-2012-0077184.

J. Sauvola, M. Pietikainen; "Adaptive document image binarization"; Pattern Recognition 33 (2000), pp. 225-236.

A. Antonacopoulos, C. Casado Castilla; "Flexible Text Recovery from Degraded Typewritten Historical Documents"; IEEE-CS Press, 2006, pp. 1062-1065.

European Search Report issued Oct. 4, 2013 in Corresponding European Application No. 12170830.9.

* cited by examiner

IMAGE PROCESSING DEVICE AND METHOD

CROSS-REFERENCE TO RELATED APPLICATIONS

This Application claims the benefit of Chinese patent Application No. 201110209866. X, filed Jul. 19, 2011, and entitled "Image Processing Device and Method", the entire subject matter of which is hereby incorporated herein by reference.

TECHNICAL FIELD

The embodiments relates to image processing device and method, and particularly to image processing and method for recognizing strokes and lines in an image.

BACKGROUND ART

The technique of separating text and figures from a document image is very useful, and may be used for document layout analysis, document image layer compression, etc. Existing commercial products include a document image compression technique, it is capable of, for example under a condition of 300 DPI sampling in color mode, compressing a typical magazine page into 40-60 KB, which is about 5-10 times of the compression ratio of JPEG, while maintaining a subjectively similar image quality. The first stage of a typically existing image compression technique is separating foreground (text) from background (figures and document background) by the two dimensional Hidden Markov Model. It usually causes over-segmentation at the initial stage of separating the foreground, so some different filters are applied to delete most of the apparent errors.

SUMMARY

According to an embodiment, an image processing device is provided, the device including: a local mean image generating section configured to generate a local mean image of an image to be processed; a binarization image generating section configured to generate a binarization image of the image, wherein in the binarization image, pixels corresponding to high frequency regions have a first grey scale and pixels corresponding to low frequency regions have a second grey scale; a ternarization image generating section configured to divide, based on comparison between the image and the local mean image, regions having the first grey scale in the binarization image into regions having the first grey scale and regions having a third grey scale, so as to generate a ternarization image; a filling section configured to recognize connected regions having the second grey scale in the ternarization image, to fill the connected regions with the first grey scale when a ratio of an amount of pixels having the first grey scale to that of pixels having the third grey scale at boundaries of the connected regions is greater than a predetermined threshold, and to fill the connected regions with the third grey scale when a ratio of an amount of pixels having the third grey scale to that of pixels having the first grey scale at boundaries of the connected regions is greater than the predetermined threshold; and a recognizing section configured to recognize strokes and lines in the image according to consistency of grey scale at object boundaries in the filled ternarization image.

According to another embodiment, an image processing method is provided, the method including steps of generating a local mean image of an image to be processed; generating a binarization image of the image, wherein in the binarization image, pixels corresponding to high frequency regions in the image have a first grey scale and pixels corresponding to low frequency regions in the image have a second grey scale; dividing, based on comparison between the image and the local mean image, regions having the first grey scale in the binarization image into regions having the first grey scale and regions having a third grey scale, so as to generate a ternarization image; recognizing connected regions having the second grey scale in the ternarization image, filling the connected regions with the first grey scale when a ratio of an amount of pixels having the first grey scale to that of pixels having the third grey scale at boundaries of the connected regions is greater than a predetermined threshold, and filling the connected regions with the third grey scale when a ratio of an amount of pixels having the third grey scale to that of pixels having the first grey scale at boundaries of the connected regions is greater than the predetermined threshold; and recognizing strokes and/or lines in the image according to consistency of grey scale at object boundaries in the filled ternarization image.

The image processing device and method according to the embodiments have for example the following features:
being capable of recognizing both dark text on bright background and bright text on dark background;
being capable of simultaneously recognizing text in various sizes, and simultaneously recognizing text having various stroke thicknesses;
the recognition of text being not restricted by languages;
being capable of recognizing forms or lines

BRIEF DESCRIPTION OF THE DRAWINGS

By referring to the explanations of the present embodiments in conjunction with the Drawings, the above and other objects, features and advantages of the present embodiments will be understood more easily. To avoid obscuring the embodiments by unnecessary details, only device structures and/or process steps closely related to the solution of the embodiments are illustrated in the Drawings, and other details not closely related to the embodiments are omitted.

DETAILED DESCRIPTION OF THE SPECIFIC EMBODIMENTS

Figure 1:
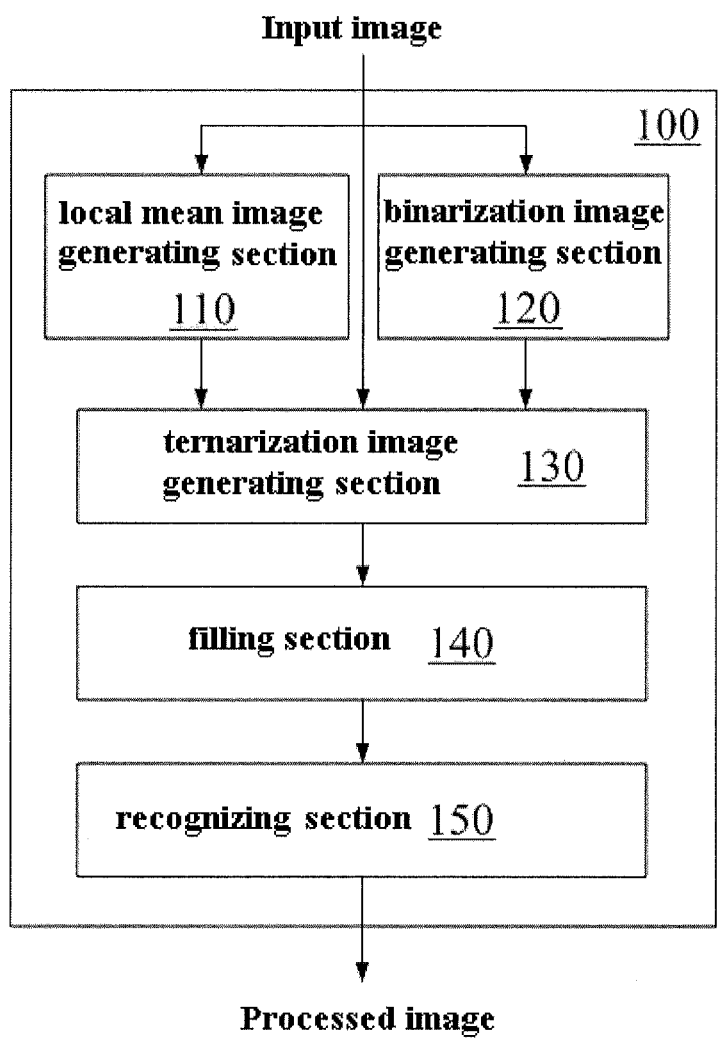
FIG. 1 illustrates an example of a configuration of the image processing device according to an embodiment.

Embodiments are described hereinafter in conjunction with the Drawings. It should be noted that representation and description of components and processes unrelated to the present embodiments and well known to one of ordinary skill in the art are omitted in the Drawings and the Description for the sake of clearness.

FIG. 1 illustrates an example of a configuration of the image processing device according to an embodiment. An image processing device 100 comprises a local mean image generating section 110, a binarization image generating section 120, a ternarization image generating section 130, a filling section 140 and a recognizing section 150.

An image used as a processing object of the image processing device 100 may be grey scale image or color image (for a color input image, it may be converted into grey scale image by conventional method in the art), and the image may include contents such as figure, text, lines, etc. When the input image is a highly compressed image, the image processing device 100 may perform smoothing process on the image using low pass filter (for example, Gauss filter), so as to inhibit noise due to the compression.

Figure 2A:
FIG. 2A illustrates an example of an image processing object.

For example, FIG. 2A illustrates an example of input image used as the processing object of the image processing device 100, wherein the image includes large text in upper left portion, small text in lower left portion and a figure in the right side.

The input image is provided to the local mean image generating section 110, and the local mean image generating section 110 calculates a local mean image based on the input image. Specifically, the local mean image generating section 110 may calculate local mean values pixel by pixel using local window (for example a window of 5 pixels×5 pixels or 7 pixels×7 pixels), so as to generate a local mean image. In some embodiments, the size of the local window used by the local mean image generating section 110 may be set according to the thickness of strokes and/or lines of the processing object image.

Figure 2B:
FIG. 2B illustrates a local mean image of the image shown in FIG. 2A.

For example, FIG. 2B illustrates a local mean image generated by the local mean image generating section 110 from the exemplary input image shown in FIG. 2A.

The input image is also provided to the binarization image generating section 120. The binarization image generating section 120 generates a binarization image from the input image. In the binarization image, pixels located at positions corresponding to high frequency regions in the input image have a first grey scale and pixels located at positions corresponding to low frequency regions in the input image have a second grey scale. For example, the binarization image may be a local variance image or a local gradient image, and the binarization image generating section 120 may calculate a local variance or a gradient pixel by pixel using a local window (for example a window of 5 pixels×5 pixels or 7 pixels×7 pixels), so as to generate a binarization image. In some embodiments, the size of the local window used by the binarization image generating section 120 may be set according to the thickness of strokes and/or lines of the processing object image.

According to a specific embodiment, in case of using 8-bit grey scale image (256 grey scale levels in total), take the first grey scale as 0 (black), and the second grey scale as 255 (white).

Figure 2C:
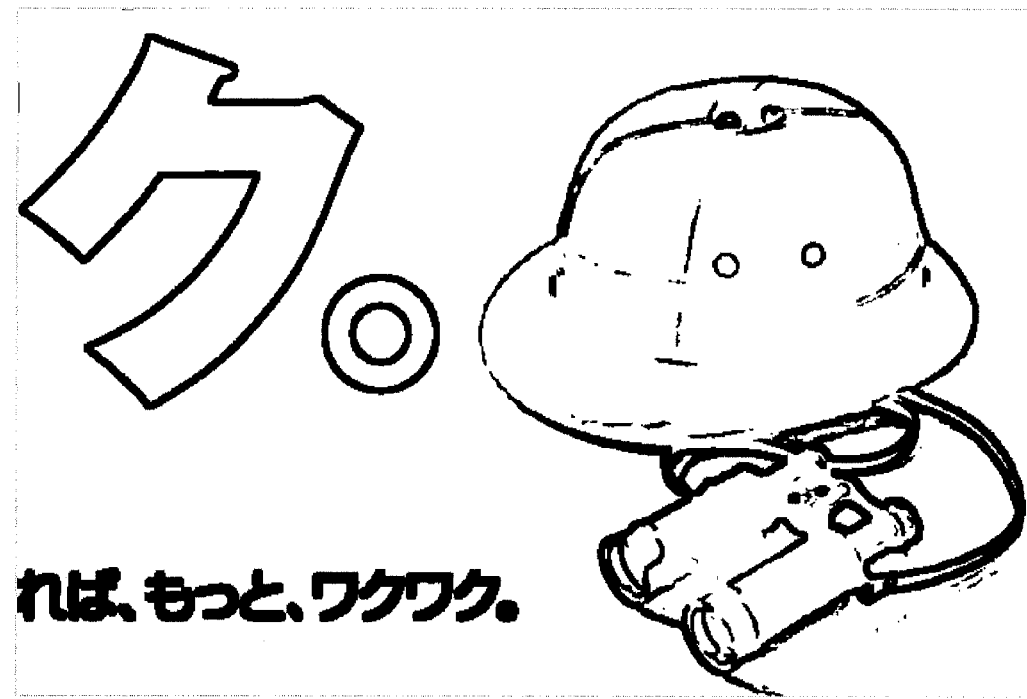
FIG. 2C illustrates a local variance image of the image shown in FIG. 2A.

For example, FIG. 2C illustrates a local variance image generated by the binarization image generating section 120 from the exemplary input image shown in FIG. 2A. In the local variance image, regions corresponding to high frequency regions (regions having high variance) in the input image have a grey scale 0 (black portion), while regions corresponding to low frequency regions (regions having low variance) in the input image have a grey scale 255 (white portion).

The binarization image generating section 120 provides the binarization image generated from the input image to the ternarization image generating section 130. The ternarization image generating section 130 divides, based on comparison between the input image and the local mean image, regions having the first grey scale in the binarization image provided by the binarization image generating section 120 into regions having the first grey scale and regions having a third grey scale, so as to generate a ternarization image.

According to one embodiment, the ternarization image generating section 130 divides the binarization image by the following rules to generate a ternarization image:

if $V(i, j)=0$ and $I(i, j) \leq M(i, j)$, then $T(i, j)=0$;
if $V(i, j)=0$ and $I(i, j)>M(i, j)$, then $T(i, j)=128$;
if $V(i, j)=255$, then $T(i, j)=255$, wherein $V(i, j)$ denotes the grey scale value of pixel $(i, j)$ in the binarization image, $I(i, j)$ denotes the grey scale values of pixel $(i, j)$ in the input image, $M(i, j)$ denotes the grey scale value of pixel $(i, j)$ in the local mean image, and $T(i, j)$ denotes the grey scale value of pixel $(i, j)$ in the ternarization image. In this specific embodiment, take the third grey scale as 128.

That is, based on comparison between the input image and the local mean image, parts of the regions having the first grey scale in the binarization image is converted into a third grey scale, for the corresponding pixels of such parts, the grey scale value of the input image is greater than the grey scale value of the local mean image.

Figure 2D:
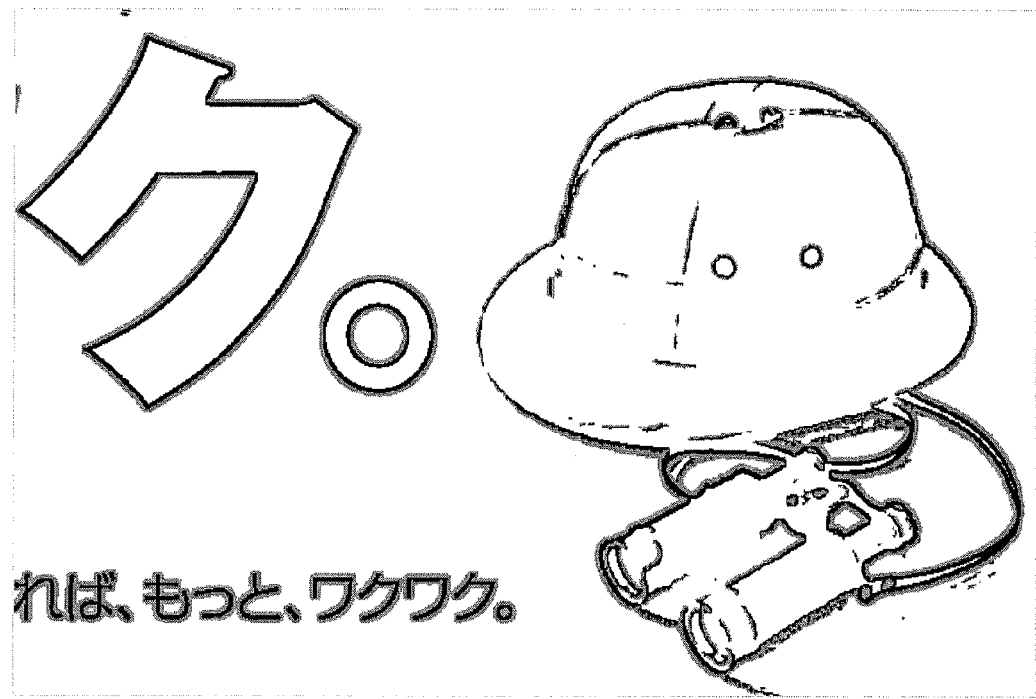
FIG. 2D illustrates a ternarization image generated based on the image shown in FIG. 2A and the local mean image thereof.

For example, FIG. 2D illustrates a ternarization image generated from the binarization image in FIG. 2C based on comparison between the input image in FIG. 2A and the local mean image in FIG. 2B. The dark grey regions in FIG. 2D (the third grey scale, that is, pixel regions whose grey scale is 128) correspond to pixel regions in which the grey scale value in the input image in FIG. 2A is greater than the grey scale value of corresponding pixels in the local mean image in FIG. 2B.

The ternarization image generating section 130 provides the generated ternarization image to the filling section 140. The filling section 140 recognizes connected regions having the second grey scale in the ternarization image, and fills the connected regions having the second grey scale with the first grey scale or the third grey scale by predetermined rules. Specifically, a connected region is filled with the first grey scale when a ratio of the amount of pixels having the first grey scale to the amount of pixels having the third grey scale at boundaries of the connected region is greater than a predetermined threshold, and a connected region is filled with the third grey scale when a ratio of the amount of pixels having the third grey scale to the amount of pixels having the first grey scale at boundaries of the connected region is greater than the predetermined threshold. The filling process performed by the filling section 140 aims at filling regions having the second grey scale which may exist inside thicker strokes or lines in the ternarization image, and the filling process uses the characteristic that a stroke or line object usually has higher consistency of boundary grey scale in the ternarization image.

According to one embodiment, when pixels adjoining the boundary of a connected region of grey scale 255 (the second grey scale) satisfy $N_0/(N_0+N_{128})>T_{ratio}$, the connected region is filled with grey scale 0 (the first grey scale), and when pixels adjoining the boundary of a connected region satisfy $N_{128}/(N_0+N_{128})>T_{ratio}$, the connected region is filled with grey scale 128 (the third grey scale), wherein $N_0$ and $N_{128}$ denote the amounts of pixels having grey scale 0 and grey scale 128 adjoining the boundary of the connected region of grey scale 255, respectively, $T_{ratio}$ denotes the threshold of the pixel amount ratio. According to one specific embodiment, $T_{ratio}=95\%$. In addition, different thresholds may be set according to different input images and the size of the local window used by the local mean image generating section 110 and the binarization image generating section 120.

Figure 2E:
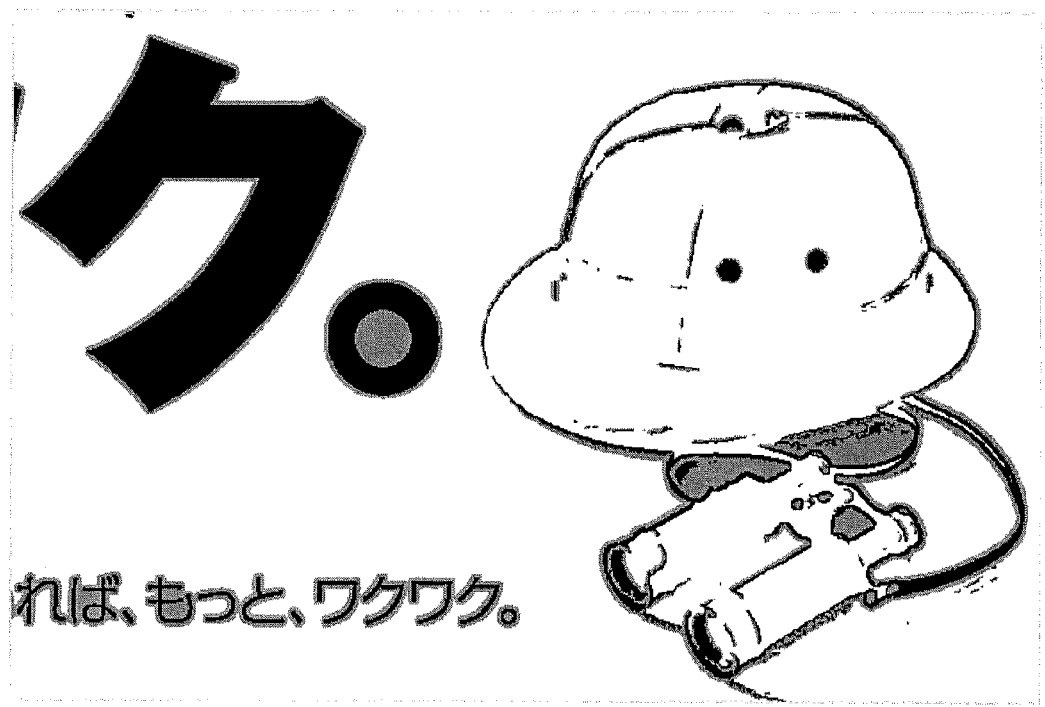
FIG. 2E illustrates a filled ternarization image of FIG. 2D.

For example, FIG. 2E illustrates an example of a filled ternarization image of FIG. 2D. It can be seen that the white connected regions in large characters at upper left of FIG. 2D are filled with black in FIG. 2E because they satisfy the first grey scale filling condition, parts of the white connected regions in small characters at lower left of FIG. 2D are filled with dark grey in FIG. 2E because they satisfy the third grey scale filling condition, and parts of the white connected regions satisfying the filling condition of the figure portion in the right side of FIG. 2D filled with black or dark grey, respectively.

In addition, in order to ensure that the filing section 140 fills only the regions having the second grey scale inside strokes or lines, in addition to the criterion of pixel amount ratio at the boundary as mentioned above, the filling section 140 may further determine whether to fill the connected regions having the second grey scale in the ternarization image according to one or all of the following criterions:

(a) the area of the connected region is smaller than a predetermined threshold; and (b) the consistency of grey scale inside the connected region reaches a predetermined criterion, i.e., the grey scale variation range of pixels inside the region is smaller than a predetermined threshold.

The filling section 140 provides the filled ternarization image to the recognizing section 150. The recognizing section 150 recognizes strokes and/or lines in the image according to the consistency of grey scale at object boundaries in the filled ternarization image. Specifically, the recognizing section 150 recognizes strokes and/or lines according to the ratio of the amount of pixels having the first grey scale to the amount of pixels having the third grey scale at the boundary of a connected region (object) which is consisted by pixels having the first grey scale and pixels having the third grey scale in the filled ternarization image. For example, when pixel amount ratio at the boundary satisfies $N_{128}/(N_0+N_{128})>T_{ratio}$, recognize the portion whose grey scale is 0 in the object as stroke and/or line, and when $N_0/(N_0+N_{128})>T_{ratio}$, recognize the portion whose grey scale is 128 in the object as stroke and/or line. According to one specific embodiment, $T_{ratio}=95\%$. In addition, different thresholds may be set according to different input images and the size of local window used by the local mean image generating section 110 and the binarization image generating section 120.

Figure 2F:
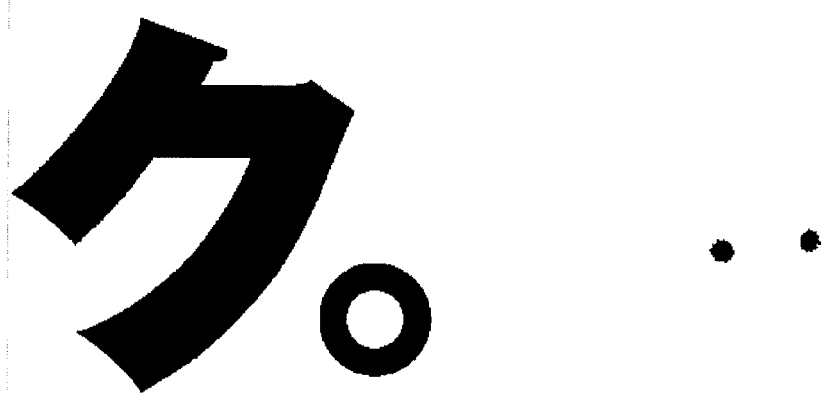
FIG. 2F illustrates an object recognized from the filled ternarization image of FIG. 2E.

For instance, FIG. 2F illustrates strokes and/or lines recognized by the recognizing section 150 from the filled ternarization image of FIG. 2E. Wherein, large characters at upper left and small characters at lower left are recognized. In addition, the portion satisfying the recognizing condition in the figure section in the right side is also recognized as strokes and/or lines.

Figure 3A:
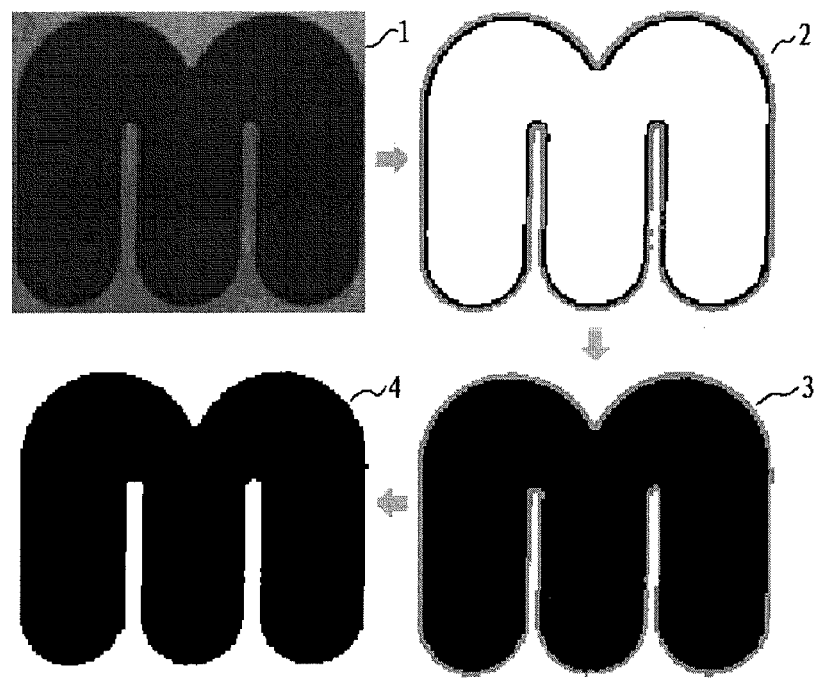
FIG. 3A illustrates a specific example of recognizing dark text on bright background.
Figure 3B:
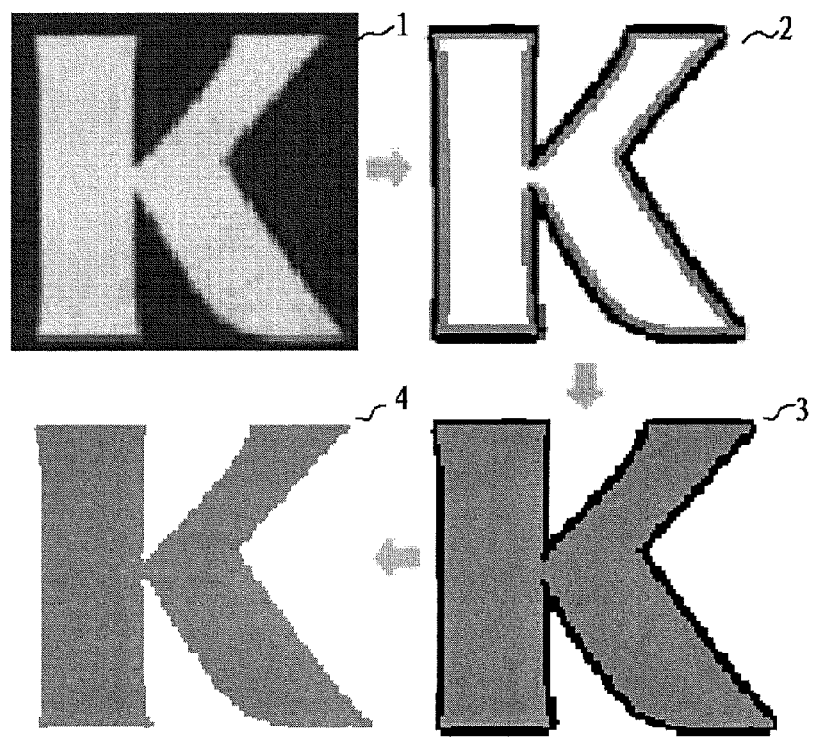
FIG. 3B illustrates a specific example of recognizing bright text on dark background.

FIG. 3A illustrates a specific example of recognizing dark text on bright background, and FIG. 3B illustrates a specific example of recognizing bright text on dark background. 1, 2, 3 and 4 in FIGS. 3A and 3B are indicative of input image, ternarization image, filled ternarization image and recognized character, respectively.

There is a dark character "m" on bright background in the input image of 1 in FIG. 3A. In 2 of FIG. 3A, since pixels adjoining the boundary of the connected region having the second grey scale (white) are mostly pixels having the first grey scale (black), in 3 of FIG. 3A, the connected region is filled with the first grey scale. In addition, since the pixels at the boundary of the filled object are mostly of the third grey scale, the pixel region having the first grey scale in 4 of FIG. 3A is recognized as a character.

There is a bright character "K" on dark background in the input image of 1 in FIG. 3B. In 2 of FIG. 3B, since pixels adjoining the boundary of the connected region having the second grey scale (white) are mostly pixels having the third grey scale (dark grey), in 3 of FIG. 3B, the connected region is filled with the third grey scale. In addition, since the pixels at the boundary of the filled object are mostly pixels having the first grey scale (black), the pixel region having the third grey scale in 4 of FIG. 3A is recognized as a character.

Therefore, the image processing device according to the embodiments can recognize both dark text on bright background and bright text on dark background.

Figure 4:
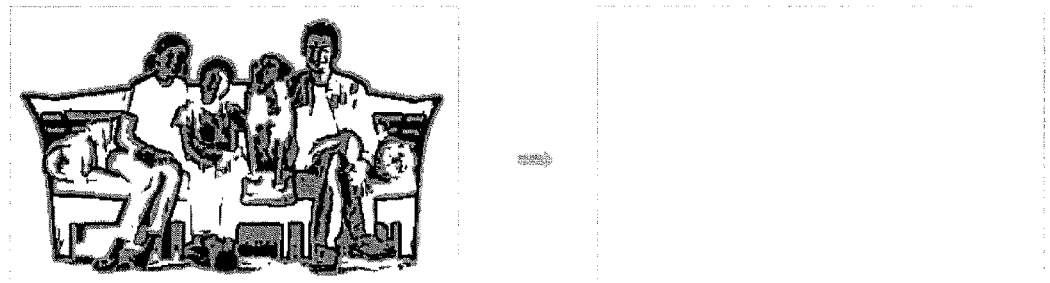
FIG. 4 illustrates an example of a processing result of an image portion not including strokes and lines.

FIG. 4 illustrates an example of processing result of the image processing device according to the embodiment on an image portion which includes no stroke or line. The left side of FIG. 4 is a filled ternarization image, since there are a lot of pixels having the first grey scale as well as a lot of pixels having the third grey scale at the object boundary, the object does not satisfy the recognizing criterion, and thus no stroke or line is recognized.

Figure 5:
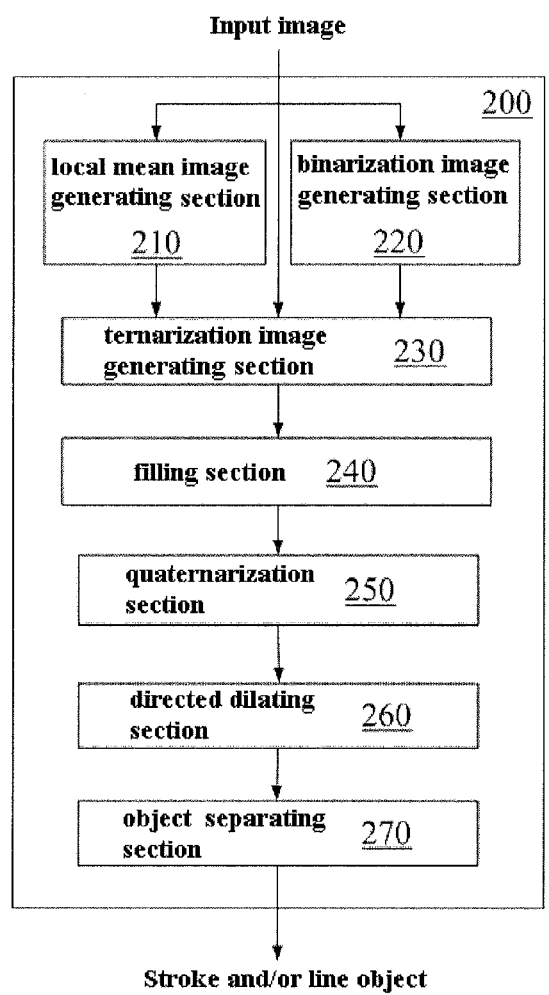
FIG. 5 is a block diagram illustrating a configuration example of the image processing device according to another embodiment.

Next, a configuration example of the image processing device 200 according to another embodiment will be described with reference to FIG. 5.

The image processing device 200 comprises a local mean image generating section 210, a binarization image generating section 220, a ternarization image generating section 230, a filling section 240, a quaternarization section 250, a directed dilation section 260 and an object separating section 270. Wherein, the local mean image generating section 210, the binarization image generating section 220, the ternarization image generating section 230, and the filling section 240 are similar to the local mean image generating section 110, the binarization image generating section 120, the ternarization image generating section 130, and the filling section 140 described with reference to FIG. 1, and descriptions thereof are omitted herein.

The filling section 240 provides the filled ternarization image to the quaternarization section 250. The quaternarization section 250 divides, based on the grey scale value of the pixels in corresponding regions of the input image, regions having a second grey scale in the ternarization image into background region and figure region, wherein the background region has the second grey scale and the figure region has a fourth grey scale, so as to generate a quaternarization image. According to an embodiment, the quaternarization section 250 divides regions in the input image corresponding to the regions having the second grey scale in the filled ternarization image using a grey scale threshold, wherein the portion having higher grey scale value is divided into background portion, and the portion having lower grey scale value is divided into figure portion. In addition, the quaternarization section 250 may also divide the background portion and the figure portion according to the consistency of grey scale of the corresponding regions in the input image, that is, the grey scale variation range of the pixels in the region. For example, a region having smaller grey scale variation is divided into the background region, and a region having larger grey scale variation is divided into the figure region. According to a specific embodiment, in case of using 8 bit grey scale image, take the fourth grey as 192 (light grey).

The quaternarization section 250 provides the quaternarization image to the directed dilation section 260. The directed dilation section 260 eliminates, by way of directed dilation, portions having the first grey scale and the third grey scale at boundaries of the background regions and the figure regions in the quaternarization image, thereby eliminating redundancy lines at the boundary of the background region and the figure region.

According to one specific embodiment, the directed dilation section 260 performs directed dilation by the following rules:

(a) if pixel regions having the third grey scale at the boundary of the background region and the figure region are connected with pixel regions having the second grey scale, then change the pixel regions having the third grey scale into the second grey scale (128→255);

(b) if pixel regions having the first grey scale at the boundary of the background region and the figure region are connected with pixel regions having the fourth grey scale, then change the pixel regions having the first grey scale into the fourth grey scale (0→192);

(c) if pixel regions having the third grey scale at the boundary of the background region and the figure region are connected with pixel regions having the fourth grey scale, then change the pixel regions having the third grey scale into the fourth grey scale (128→192).

Figure 6A:
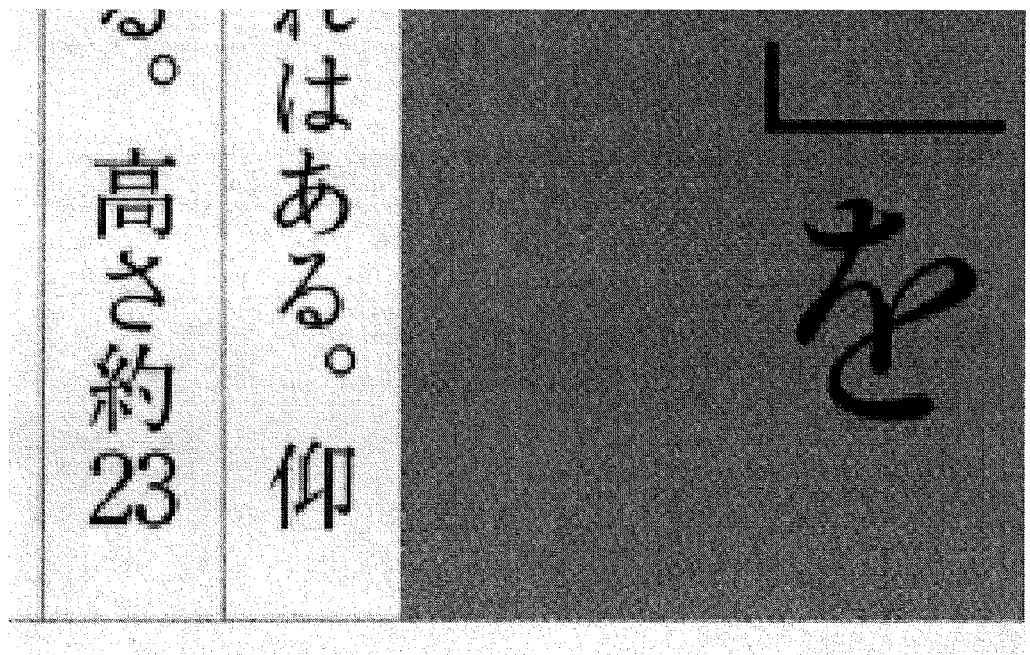
FIGS. 6A to 6C is an example of performing directed dilation on a quaternarization image.
Figure 6B:
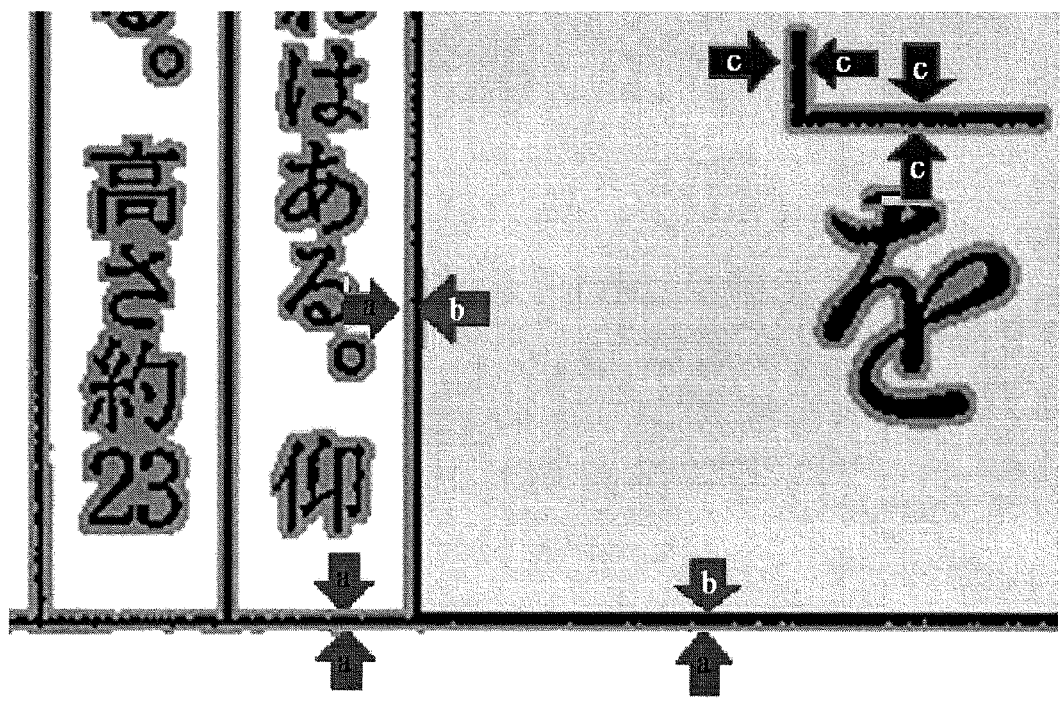
Figure 6C:
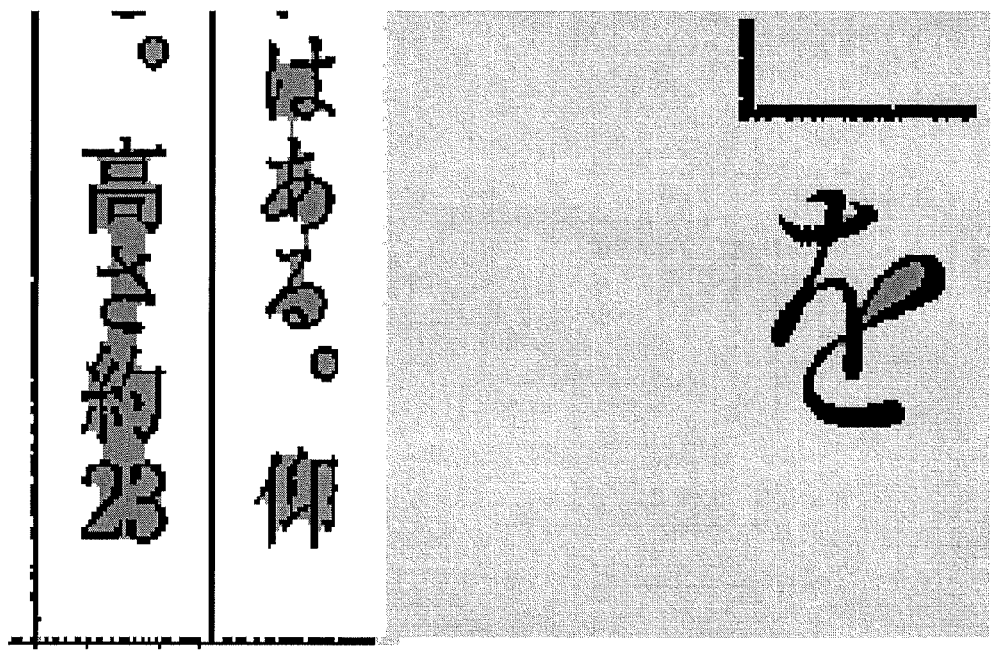

FIGS. 6A to 6C illustrate an example of performing directed dilation on the quaternarization image by the above rules. FIG. 6A is an input image, FIG. 6B is a quaternarization image, wherein the white portion is the portion recognized as the background region, and the light grey portion is the portion recognized as the figure region. In addition, arrows a, b and c in FIG. 6B are indicative of portions to be directedly dilated by the above rules a-c, respectively. FIG. 6C illustrates an image processed by the directed dilation, wherein portions having the first grey scale (black) and the third grey scale (dark grey) are eliminated from the boundary of the background region and the figure region.

The directed dilation section 260 provides the directedly dilated quaternarization image to the object separating section 270. The object separating section 270 separates, from the directedly dilated quaternarization image, regions having the first grey scale and/or regions having the third grey scale as strokes and/or lines.

Figures 7A, 7B:
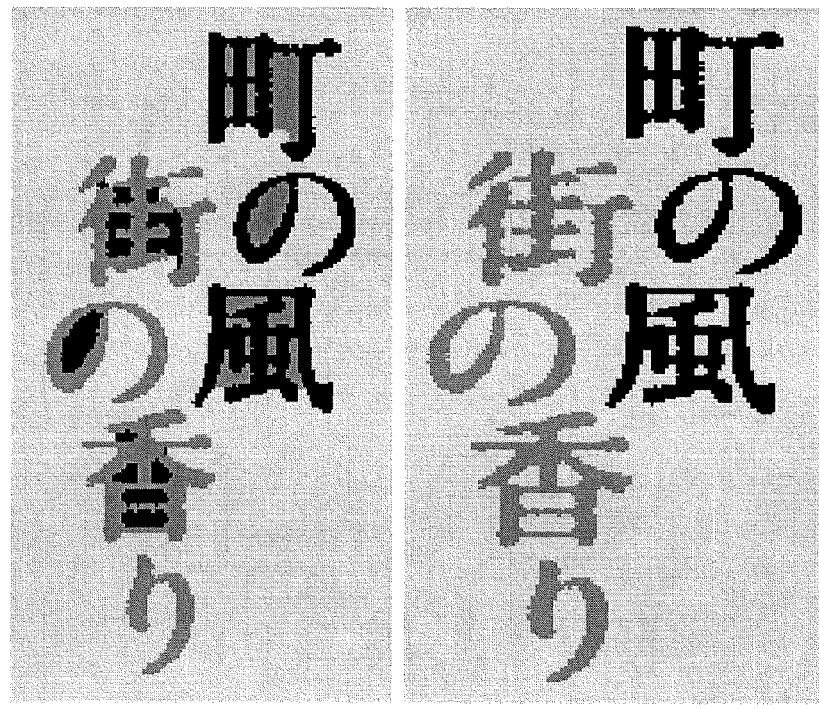
FIGS. 7A and 7B illustrate an example of text separated from the quaternarization image.

FIG. 7A illustrates an example of strokes and lines separated from the quaternarization image.

It can be seen from the figure that the separated text portions having the first or third grey scale may include pixel portions having the third or first grey scale. Therefore, according to an embodiment, the object separating section 270 may further process the connected regions (object) consisted of pixels having the first grey scale and pixels having the third grey scale in the directedly dilated quaternarization image by the following rules:

(1) if a ratio of the amount of pixels having the second grey scale to the amount of pixels having the fourth grey scale adjoining the object is greater than a predetermined threshold ($n_{255}/(n_{192}+n_{255})>T_{ratio}$), then converting pixels having the third grey scale in the object into the second grey scale (128→255) (this case corresponds to the black text in the background region); otherwise (2) if a ratio of the amount of pixels having the first grey scale to the amount of pixels having the third grey scale at the object boundary is greater than the predetermined threshold ($n_0/(n_0+n_{128})>T_{ratio}$), then converting pixels having the third grey scale in the object into the fourth grey scale (128→192) (this case corresponds to the black text in the figure region);

(3) if a ratio of the amount of pixels having the third grey scale to the amount of pixels having the first grey scale at the object boundary is greater than the predetermined threshold ($n_{128}/(n_0+n_{128})>T_{ratio}$), then converting pixels having the first grey scale in the object into the fourth grey scale (0→192) (this case corresponds to the dark grey text in the figure region).

FIG. 7B illustrates a result of performing the above process on the objects in FIG. 7A.

According to one specific embodiment, $T_{ratio}=95\%$. In addition, different thresholds may be set according to different input images and the size of the local window used by the local mean image generating section 210 and the binarization image generating section 220.

FIG. 8 illustrates an example of processing result of the image processing device 200 according to the embodiment on an image including a figure, text and lines.

Figure 8A:
FIGS. 8A and 8B illustrate an example of a processing result of an image including figure, text and lines by the image processing device according to the embodiment.

The input image is as shown in FIG. 8A, wherein the input image includes background, text on the background ("董事长 ... 01 年7月)"), a figure (photo), text in the figure region ("富士通 ... 开业仪式") and lines, etc.

Figure 8B:
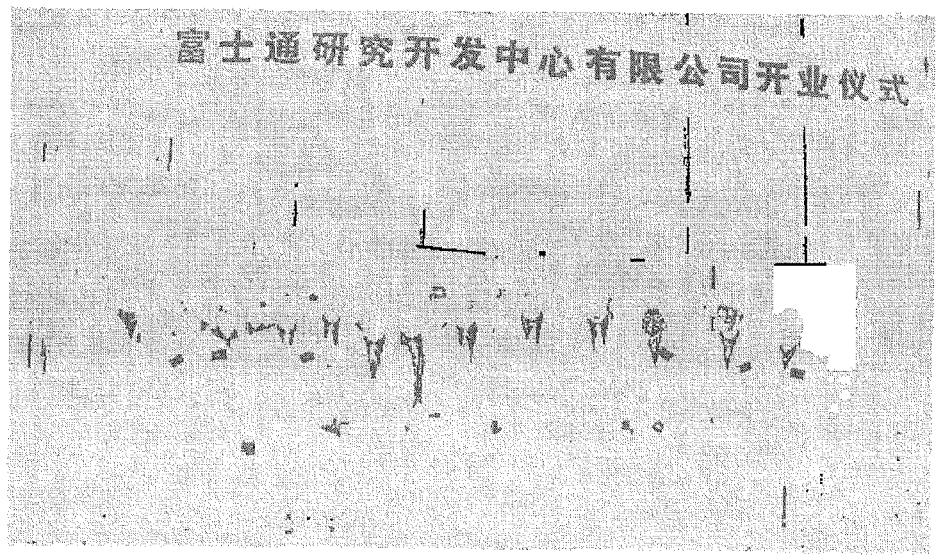

The output image is as shown in FIG. 8B, wherein the output image is a quaternarization image, that is, the pixels therein are divided into four categories: dark text or line (black, grey scale is 0), bright text or line (dark grey, grey scale is 128), figure region (light grey, grey scale is 192) and background region (white, grey scale is 255).

It can be seen from FIG. 8 that the image processing device 200 according to the embodiment is capable of separating text and lines in the background region as well as text and lines in the figure region, and it is capable of separating both dark text on bright background and bright text on dark background.

Figure 9:
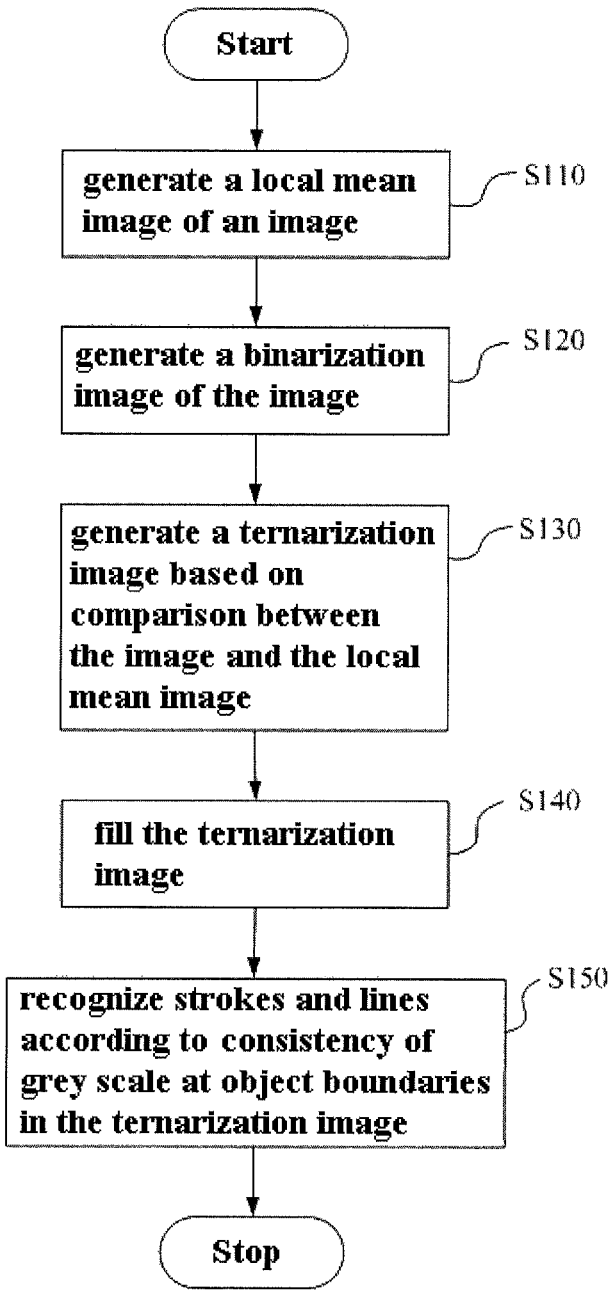
FIG. 9 illustrates a flowchart of the image processing method according to an embodiment.

FIG. 9 illustrates a flowchart of an image processing method according to an embodiment.

At step S110, generating a local mean image of an image to be processed;

At step S120, generating a binarization image of the image, in which pixels corresponding to high frequency region in the image having a first grey scale, and pixels corresponding to low frequency region in the image having a second grey scale.

At step S130, dividing, based on comparison between the image and the local mean image, regions having the first grey scale in the binarization image into regions having the first grey scale and regions having a third grey scale, so as to generate a ternarization image;

At step S140, recognizing connected regions having the second grey scale in the ternarization image, filling the connected regions with the first grey scale when a ratio of an amount of pixels having the first grey scale to that of pixels having the third grey scale at boundaries of the connected regions is greater than a predetermined threshold, and filling the connected regions with the third grey scale when a ratio of an amount of pixels having the third grey scale to that of pixels having the first grey scale at boundaries of the connected regions is greater than the predetermined threshold;

At step S150, recognizing strokes and/or lines in the image according to consistency of the grey scale at object boundaries in the filled ternarization image.

Figure 10:
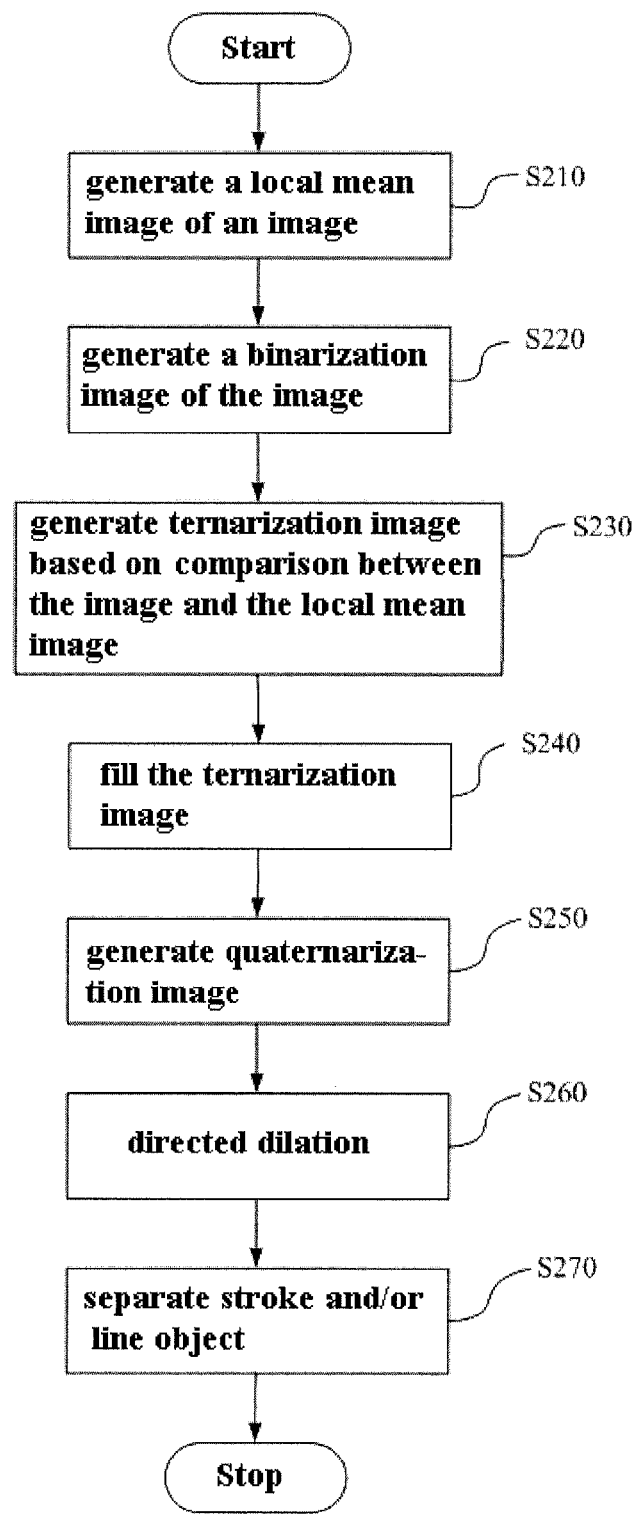
FIG. 10 illustrates a flowchart of the image processing method according to another embodiment.

FIG. 10 illustrates a flow chart of the image processing method according to another embodiment.

At step S210, generating a local mean image of an image to be processed;

At step S220, generating a binarization image of the image, in which pixels corresponding to high frequency region in the image having a first grey scale, and pixels corresponding to low frequency region in the image having a second grey scale.

At step S230, dividing, based on comparison between the image and the local mean image, regions having the first grey scale in the binarization image into regions having the first grey scale and regions having a third grey scale, so as to generate a ternarization image of the image;

At step S240, recognizing connected regions having the second grey scale in the ternarization image, filling the connected regions with the first grey scale when a ratio of an amount of pixels having the first grey scale to that of pixels having the third grey scale at boundaries of the connected regions is greater than a predetermined threshold, and filling the connected regions with the third grey scale when a ratio of an amount of pixels having the third grey scale to that of pixels having the first grey scale at boundaries of the connected regions is greater than the predetermined threshold;

At step S250, dividing, based on grey scale values of pixels in corresponding regions of the image, regions having the second grey scale in the filled ternarization image into background regions having the second grey scale and figure regions having a fourth grey scale, so as to generate a quaternarization image;

At step S260, eliminating, through a directed dilation, regions having the first grey scale and the third grey scale at boundaries of the background regions and the figure regions in the quaternarization image;

At step S270, separating, from the directedly dilated quaternarization image, regions having the first grey scale and/or regions having the third grey scale as strokes and/or lines A person skilled in the art would appreciate that the embodiments may be embodied as a device, method or computer program product. Therefore, the embodiments may be implemented specifically in the following forms, i.e., it may be a complete hardware, complete software (including firmware, resident software, microcode, etc.), or a combination of the software and the hardware. In addition, the embodiments may be in the form of computer program product embodied in any tangible medium including program code available for a computer.

Any combination of one or more of computer readable medium may be used. Computer readable medium can be computer readable signal medium or computer readable storage medium, wherein the computer-readable storage medium may be, but not limited to, for example, electrical, magnetic, optical, electromagnetic, infrared, or semiconductor system, device, component or propagation medium, or any appropriate combination of the foregoing items. More specific examples of the computer-readable storage medium (non-exhaustive list) include: electrical connection having one or more conductors, portable computer disc, hard disc, Random Access Memory (RAM), Read-Only Memory (ROM), Erasable Programmable Read-Only Memory (EPROM or Flash memory), optical fiber, portable compact disc Read-Only Memory (CD-ROM), optical memory device, magnetic memory device, or any appropriate combination of the foregoing items. In this context, computer-readable storage medium may be any tangible medium containing or storing programs used by or associated with the instruction execution system, device or component.

The computer program code used to execute the operation of the present embodiments may be compiled in any combination of one or more of programming languages, the program languages include object-oriented programming language, such as Java, Smalltalk, C++ and the like, and further include conventional procedural programming languages, such as "C" programming language or similar programming language. Program code may be completely executed on the user's computer, partly on the user's computer, as an independent software package, partly on the user's computer and partly on the remote computer or entirely on the remote computer or server. In the latter case, the remote computer may be connected to the user's computer by any kind of network including local area network (LAN) or wide area network (WAN), or may be connected to an external computer (for example via Internet by using Internet service provider).

Figure 11:
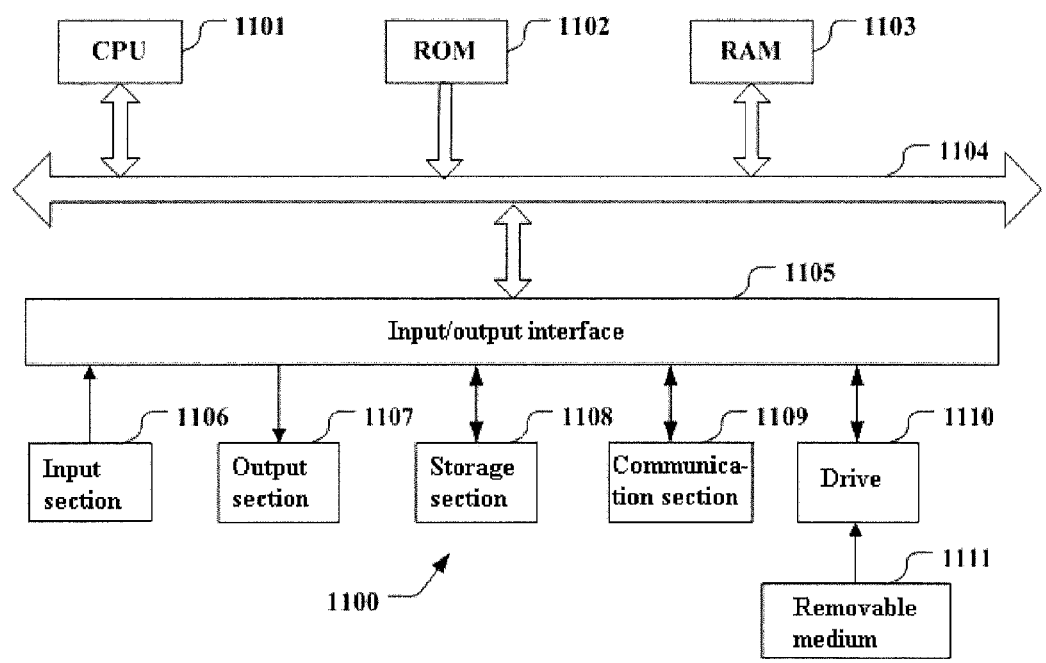
FIG. 11 is a block diagram illustrating an exemplary structure of a computer in which the device and method of the embodiment are implemented.

FIG. 11 is a block diagram illustrating an example structure of a computer implementing the device and method of the embodiment.

In FIG. 11, a central processing unit (CPU) 1101 perform various processes according to the program stored in the Read-Only Memory (ROM) 1102 or programs loaded from the storage section 1108 to the Random Access Memory (RAM) 1103. In the RAM 1103, data required when the CPU 1101 performs various processes is also stored as needed.

CPU 1101, ROM 1102 and RAM 1103 are connected from one to another via bus 1104. Input/output interface 1105 is also connected to bus 1104.

the following components are connected to the input/output interface 1105: input section 1106, including keyboard, mouse, etc.; output section 1107, including display, such as cathode ray tube (CRT), liquid crystal display (LCD), etc., and speakers and so on; storage section 1108, including hard disc, etc.; and communication part 1109, including network interface cards such as LAN cards, modems and so on. The communication section 1109 performs communication process via network like the Internet.

According to requirements, drive 1110 is also connected to the input/output interface 1105. Removable medium 1111 such as magnetic disc, optical disc, magneto-optical disc, semiconductor memory, and so on is installed on the drive 1110 as required, such that the computer program read out therefrom is installed in the storage section 1108 as required.

In case of implementing the above steps and processes by software, programs constituting the software are installed from a network like the Internet or from a storage medium like the removable medium 1111.

Those skilled in the art should understand that such storage medium is not limited to the removable medium 1111, as shown in FIG. 11, which is stored with programs and distributed separately from the method to provide a user with program. The example of the removable medium 1111 includes magnetic disc, optical disc (including compact disc read only memory (CD-ROM) and digital versatile disc (DVD)), magneto-optical disc (including mini-disc (MD)) and semiconductor memory. Alternatively, the storage medium may be ROM 1102, or hard disc included in the storage section 1108 in which a program is stored and the program is distributed to a user with the method including the same.

Corresponding structures, operations, and equivalences of all the functionally defined devices and steps in the claims are intended to include structures or operations used for executing the function in combination with other units specifically indicated in the Claims. The description of the embodiment as provided above is illustrative and is for the purpose of description, but is not exhaustive, nor does it define the embodiments with the described form. For those skilled in the art, it is apparent that many changes and variations of the embodiments can be made without departing from the scope and spirit of the Claims. The selection and the description of embodiments are for the purpose of better explaining the principles and practical applications of the embodiments, those skilled in the art can understand that the embodiments can have various embodiments having various changes suitable for particular intended uses.

The invention claimed is:

1. An image processing device comprising:
a local mean image generating section configured to generate a local mean image of an image to be processed;
a binarization image generating section configured to generate a binarization image of said image to be processed, where pixels corresponding to high frequency regions in said image to be processed have a first grey scale and pixels corresponding to low frequency regions in said image to be processed have a second grey scale;
a ternarization image generating section configured to generate a ternarization image of said image to be processed by dividing, based on comparison between said image to be processed and the local mean image, regions having the first grey scale in the binarization image into regions having the first grey scale and regions having a third grey scale;
a connected-component analyzing section configured to recognize connected regions having the second grey scale in the ternarization image;
a filling section configured to fill the connected regions with the first grey scale when a ratio of an amount of pixels having the first grey scale to that of pixels having the third grey scale at boundaries of the connected regions is greater than a predetermined threshold, and to fill the connected regions with the third grey scale when a ratio of an amount of pixels having the third grey scale to that of pixels having the first grey scale at boundaries of the connected regions is greater than the predetermined threshold; and
a recognizing section configured to recognize strokes and lines in said image to be processed according to consistency of grey scale at object boundaries in the filled ternarization image.

2. The image processing device of claim 1, wherein, the filling section performs the filling under a condition that the area of the connected regions is less than a predetermined threshold and/or consistency of grey scale of the connected regions reaches a predetermined criterion.

3. The image processing device of claim 1, further comprising:
a quanternarization section configured to divide, based on grey scale values of pixels in corresponding regions of said image to be processed, regions having the second grey scale in the filled ternarization image into background regions having the second grey scale and figure regions having a fourth grey scale, so as to generate a quanternarization image.

4. The image processing device of claim 3, further comprising:
a directed dilation section configured to eliminate, through a directed dilation, regions having the first grey scale and the third grey scale at boundaries of the background regions and the figure regions in the quanternarization image.

5. The image processing device of claim 4, further comprising:
an object separating section configured to separate, from the directedly dilated quanternarization image, regions having the first grey scale and/or regions having the third grey scale as strokes and/or lines.

6. An image processing method comprising steps of:
generating a local mean image of an image to be processed;
generating a binarization image of said image to be processed, wherein pixels corresponding to high frequency regions in said image to be processed have a first grey scale and pixels corresponding to low frequency regions in said image to be processed have a second grey scale;
generating a ternarization image of said image to be processed by dividing, based on comparison between said image to be processed and the local mean image, regions having the first grey scale in the binarization image into regions having the first grey scale and regions having a third grey scale;
recognizing connected regions having the second grey scale in the ternarization image;
filling the connected regions with the first grey scale when a ratio of an amount of pixels having the first grey scale to that of pixels having the third grey scale at boundaries of the connected regions is greater than a predetermined threshold, and filling the connected regions with the third grey scale when a ratio of an amount of pixels having the third grey scale to that of pixels having the first grey scale at boundaries of the connected regions is greater than the predetermined threshold; and
recognizing strokes and lines in said image to be processed according to consistency of grey scale at object boundaries in the filled ternarization image.

7. The image processing method of claim 6, wherein, in the step of filling the connected regions, the filling is performed under a condition that the area of the connected regions is less than a predetermined threshold and/or consistency of grey scale of the connected regions reaches a predetermined criterion.

8. The image processing method of claim 6, further comprising a step of:
dividing, based on grey scale values of pixels in corresponding regions of said image to be processed, regions having the second grey scale in the filled ternarization image into background regions having the second grey scale and figure regions having a fourth grey scale, so as to generate a quanternarization image.

9. The image processing method of claim 8, further comprising a step of:
eliminating, through a directed dilation, regions having the first grey scale and the third grey scale at boundaries of the background regions and the figure regions in the quanternarization image.

10. The image processing method of claim 9, further comprising a step of:
separating, from the directedly dilated quanternarization image, regions having the first grey scale and/or regions having the third grey scale as strokes and/or lines.

* * * * *

UNITED STATES PATENT AND TRADEMARK OFFICE
CERTIFICATE OF CORRECTION

PATENT NO. : 8,907,972 B2  
APPLICATION NO. : 13/549764  
DATED : December 9, 2014  
INVENTOR(S) : Danian Zheng et al.

It is certified that error appears in the above-identified patent and that said Letters Patent is hereby corrected as shown below:

On the Title Page

Column 1, Item [73] (Assignee), Line 1, delete "Kawaski" and insert -- Kawasaki --, therefor.

In the Specification

Column 1, Line 2, delete "201110209866. X," and insert -- 201110209866.X, --, therefor.

Signed and Sealed this
Twenty-first Day of July, 2015

Michelle K. Lee
*Director of the United States Patent and Trademark Office*